United States Patent Office 3,442,713
Patented May 6, 1969

3,442,713
COMBINED ELECTROLYTE-ELECTRODE FOR
FUEL CELLS AND METHOD OF FABRICATION
Helmut Tannenberger, Geneva, and Herbert Schachner,
Grand-Lancy, Geneva, Switzerland, assignors to Compagnie Francaise de Raffinage, Paris, France
No Drawing. Filed July 14, 1966, Ser. No. 565,084
Claims priority, application Switzerland, June 10, 1966,
8,456/66
Int. Cl. H01m 27/02
U.S. Cl. 136—86                                    12 Claims This invention relates to solid electrolyte members and metallic electrode members for fuel cells, and, more particularly, to combined solid electrolyte-electrode structures having enhanced electrochemical or electrical characteristics at the metal-electrolyte interface thereof, and to the manufacture thereof.

As is well understood, fuel cells have undeniable advantages for producing energy directly from various combustible fuels. For example, such cells permit at least theoretical recoveries of 100% of the energy liberated from fuel combustion or oxidation. Consequently, from this point of view, they are very much more advantageous than sources of energy following a Carnot cycle, in which the energy recovery is barely greater than 30% of the energy liberated by combustion of the fuel.

Also, as now well understood, fuel cells function much like the classic electrochemical galvanic cells or batteries, except that the materials consumed, at both the anode and the cathode, are continuously replenished in a manner such that the fuel cell has theoretically an unlimited life. Such devices actually exist in a number of types, which may be classified according to the type of electrolyte employed, the type of fuel and comburent utilized, etc. A more precise classification of fuel cells follows the operating temperature range, nature of the electrodes, etc.

Despite all the theoretical advantages of fuel cells and the many types thereof, they have not yet enjoyed widespread industrial acceptance, particularly in areas of industry other than those where the cost of obtaining the energy produced from the fuel cells is not a dominant factor in deciding whether or not to employ them instead of other ways of generating electric energy. The reasons for this situation, probably, relate to the substantial technological difficulties in using fuel cells and the fact that the practical recovery of energy from fuel cells usually does not even come close to the recovery or conversion theoretically possible.

One significant factor which lowers the energy recovery from fuel cells relates to a difficulty known as polarization, and is, probably, the combination of a number of unfavorable phenomena which result in a significant loss of energy at the interface between the electrolyte and the electrode. Among such phenomena one may note a kinetic situation where the access of transferring ions to the electrolyte interface is limited spatially and kinetically and the products of the electrochemical combustion or oxidation at such interface are not evacuated instantaneously but follow a limited flow.

One object of this invention is to increase the access of ions and increase the rate evacuation of combustion products at the electrode-electrolyte interface in a manner to diminish the polarization effect and disadvantage due to this kinetic factor.

Considering fuel cells utilizing a solid (instead of liquid) electrolyte—e.g., zirconia stabilized into a cubic phase by a metal oxide, such as a rare earth oxide, as disclosed in co-pending application Ser. No. 325,503, filed Nov. 21, 1963, now abandoned—it will be understood that the solid electrolyte member is desirably as thin as possible (to reduce internal electrical resistance) while also being substantially gas-tight (to retain the gaseous products utilized and produced in fuel cell operation). Attempting to achieve such goals with a solid electrolyte structure (i.e., minimum thickness and a gas-tight lack of porosity) results in an electrolyte member having a generally smooth surface with relatively low effective specific surface area. On the other hand, attempting to alleviate the polarization difficulty noted above by producing a solid electrolyte structure having a porous character to increase the effective specific surface area would appear to be inconsistent or incompatible with the above noted advantageous goals for fuel cell solid electrolyte members.

According to this invention, by contrast, the above disadvantages are minimized substantially without interfering with the above advantages by providing a combination electrode-electrolyte member or structure for use in fuel cells in which are combined the advantages of minimal thickness, gas-tightness, yet substantially increased specific surface area at the electrode-electrolyte interface; and these ends are accomplished in accordance herewith by producing a combination and substantially integral and self-sustaining electrode-electrolyte device comprising generally a gas-tight and non-porous layer of electrolyte of controlled thickness, on which is applied and affixed a porous layer of electrolyte also of controlled thickness, in the pores and on the surface of which is deposited a metallic electrode layer in a manner so that the thickness thereof is less than about half the size of the pores in the porous layer to produce a porous or rough metal electrode surface of substantially increased effective specific surface are without notably increasing the total thickness of the entire device or diminishing gas-tightness thereof.

In this manner, there are here provided combination electrode-electrolyte structures where the solid electrolyte is still gas-tight yet where the effective surface of the electrode-electrolyte interface is substantially increased, but without substantially increasing either the total effective thickness or the internal resistance of the electrolyte structure, thus permitting, for a given current density, a greatly increased access of ions to the interface and a more rapid evacuation of combustion products from the interface for a given apparent surface area.

With the foregoing and additional objects in view, this invention will now be described in more detail, and other objects and advantages thereof will be apparent from the following description and the appended claims.

Generally novel features of this invention include producing a substantially non-porous and impermeable, gas-tight solid electrolyte structure of suitable composition and configuration for fuel cells, on one surface of which is applied or produced a porous or rough-surface layer of electrolyte material, on which is deposited a layer of metal to perform the electrode function. As purely illustrative of a technique with which satisfactory results have been produced in accordance herewith for such metal electrode layer, one may note depositing a layer of a metal such as nickel by thermal decomposition of a gaseous nickel compound such as nickel tetracarbonyl, flowing over the rough porous surface of the solid electrolyte. The thicknesses of both the non-porous and porous layers of electrolyte are readily controlled, in accordance with the considerations set forth therein, and the metallic layer, while being substantially continuous, is applied or deposited under controlled conditions whereby the thickness thereof is no more than about half the diameter of the pores so that the metal-coated rough or porous surface remains rough and porous after metal deposition and still presents substantially increased surface area since the metallic layer, while being of sufficient thickness to operate satisfactorily electrochemically, is still not so thick as to fill up all the pores and smooth out the desired roughness of the porous surface of the combination electrode-electrolyte surface.

More specifically, satisfactory results are obtained in accordance herewith if the solid electrolyte device, having both a porous and non-porous layer, is produced by first fritting or sintering a very fine powdered electrolyte to form the gas-tight or non-porous impervious layer (for example, stabilized zirconia having a particle size less than about one micron). Thereafter the porous and rough-surface layer is formed on one surface of the non-porous layer by depositing thereon the same powdered electrolyte in substantially larger particle size (for example, 30-300 microns) admixed and dispersed in an organic binder or liquid carrier material, after which a second fritting or sintering operation integrates the larger electrolyte grains with the non-porous layer and eliminates the binder to provide a rough or porous surface layer as desired.

An alternative procedure is to form the non-porous and gas-tight layer by projecting solid electrolyte powder against a heated support (as also disclosed in the copending application mentioned above) until the desired thickness of the non-porous layer is achieved. Thereafter, the porous and rough layer is deposited, with the additional porosity being achieved by modifying the conditions of projecting or spraying the powder—e.g., by utilizing powder of larger particle size or by moving the spraying nozzle further away from the structure being formed, etc., all as will be understood by men skilled in this art.

Similarly, satisfactory results are also and alternatively achieved in accordance herewith by compressing a fine powder of solid electrolyte into the non-porous layer of desired thickness and impermeability, thereafter forming a porous layer of larger particle size compressed onto the first layer with less than the original pressure, and fritting or sintering the combined ensemble.

As will be understood, with any of the foregoing illustrative procedures, the electrode metal is then deposited on the porous and rough layer by thermal decomposition of the gaseous compound or otherwise as may be convenient or desired. Yet, each of the procedures noted above readily permits complete control of the thickness and porosity (or lack thereof) of the solid electrolyte structure, to achieve the desired physical strength, thickness, particle size, and surface roughness or increased specific surface area consistent with obtaining the best results regarding each of the disparate or inconsistent factors involved.

Also as will be understood, it is preferred in accordance herewith that the metallic electrode layer be deposited uniformly throughout the total area of the porous layer; that is, down inside the pores as well as on the outer surfaces of the porous layer, to form a substantially continuous metallic layer of sufficient thickness for accommodating the electrode function, while maintaining substantially uniform thickness and without closing up the pores of the porous layer. If the illustrative techniques suggested above to achieve this layer is used with thermal decomposition of nickel tetracarbonyl, satisfactory results are achieved if the formed and fritted solid electrolyte structure is heated sufficiently so that the internal surface of the pores as well as the outside surface thereof is above the decomposition temperature of the nickel compound. Then the desired position of metallic nickel is achieved at atmospheric pressure by passing the gaseous nickel compound (either pure or diluted with an inert gas such as nitrogen) over the heated porous surface and within a temperature range of about 150° to 250° C.

As further illustrative of this invention, one may note a specific example of procedures for the manufacture of a combination electrode-electrolyte device in accordance herewith, and with which satisfactory results have been achieved in use in fuel cells as disclosed. The solid electrolyte material of this example was $ZrO_2$ stabilized into its cubic crystal form with $Yb_2O_3$, with these two oxides mixed in a molecular ratio of about 92% to 8%. Two batches of the same oxide mixture were provided in two different particle sizes—one was a very fine powder having a median particle diameter of the order of 0.1 micron, while the other was a coarser powder having a median particle diameter of the order of 100 microns.

The finer powder was first formed and frittered or sintered at high temperature into a non-porous disc of about 0.09 cm. in thickness and about 2.8 cm. in diameter. Then the coarser powder was deposited on one surface of the disc and the entire assembly frittered or sintered again so as to obtain a non-porous layer and a porous or rough layer with a thickness of about 0.05 cm.

The solid electrolyte structure thus obtained was placed, porous surface up, in a receptacle on a heated plate to raise the temperature to about 180° C. A mixture containing about 45% nitrogen and 55% of nickel tetracarbonyl $Ni(CO)_4$ was flowed over the porous surface at a charge rate of approximately 700 cc. per minute. As a result, there was thus deposited on the porous surface a substantially uniform layer of nickel to form the anode of a fuel cell in which the electrolyte was formed by the zirconia stabilized into cubic phase. The electrical resistance of the porous nickel-covered layer thus produced measured between the center of the disc and an annular electrode disposed around the disc (and having an internal diameter of about 2.7 cm.) was only about 0.16 ohm.

As will be apparent from the foregoing data, a satisfactory combination electrode-electrolyte for fuel cells was formed having a relatively large interface area between electrode and electrolyte, because of the porosity and roughness of the porous layer, yet without increasing the thickness of the non-porous electrolyte to an extent where internal electrical resistance becomes too great for satisfactorily efficient operation. Thus, for the same voltage of the fuel cell and the same apparent current density, a considerably lower local current density was obtained, with increased ease access of the ions to the electrode-electrolyte interface. Also, a larger current density can be withdrawn from a fuel cell having such an electrode-electrolyte structure while maintaining a local current density of no more than if the surface of the solid electrolyte member had not been rendered porous or rough in accordance herewith.

While the methods and materials and structures as described herein form preferred embodiments of this invention, it is not limited to these precise methods, materials, or structures, and changes may be made therein without departing from the scope of this invention which is defined in the appended claims.

What is claimed is:

1. A combination solid electrolyte-electrode structure for forming the electrolyte and one electrode in a fuel cell of the character described comprising a thin and substantially gas-tight and non-porous layer of solid inorganic electrolyte material, a thin porous and rough layer of substantially the same solid electrolyte material integrally formed on one surface of said non-porous layer, and a metallic electrode layer over the surface of said porous and rough layer and extending substantially continuously over the outer surface and down into the pores thereof, the thickness of said metal layer being substantially no greater than about half the diameter of said pores for providing an essentially rough and porous metal-covered surface having increased specific effective surface area of the interface between said porous electrolyte layer and said metal layer.

2. A combination electrolyte-electrode as recited in claim 1 in which said solid electrolyte material comprises zirconia stabilized into cubic crystal form by another metal oxide admixed therewith.

3. A combination electrolyte-electrode as recited in claim 2 in which said other metal oxide is an oxide of a rare earth metal.

4. A combination electrolyte-electrode as recited in claim 1 in which said metallic electrode layer is nickel.

5. A method for producing combination solid electrolyte-electrode structures for forming the electrolyte and one electrode in fuel cells of the character described comprising in combination the steps of forming a substantially non-porous thin layer of solid inorganic electrolyte material in the shape of said structure, forming on one surface of said non-porous layer a thin porous and rough layer of substantially the same solid electrolyte material, uniting and integrating said porous and non-porous layers into a self-sustaining solid electrolyte structure for said fuel cells, depositing on and over the surface of said porous and rough layer a metal electrode layer extending substantially continuously over said surface and into the pores thereof, the thickness of said metal layer being substantially no greater than about half the diameter of said pores.

6. A method as recited in claim 5 in which said metal electrode layer is deposited on said porous and rough electrolyte surface by thermal decomposition of a gaseous compound of the metal of said metal layer.

7. A method as recited in claim 6 in which said metal is nickel and said gaseous compound thereof is nickel tetracarbonyl.

8. A method as recited in claim 5 in which the difference in porosity between said porous and non-porous solid electrolyte layers is achieved by forming said non-porous layer from said electrolyte material powdered to a finer particle size than that used for said porous layer, and sintering said two layers together to form said self-sustaining solid electrolyte structure.

9. A method as recited in claim 8 in which said non-porous layer is first formed and sintered, said porous layer is thereafter deposited thereon as larger particle size material within the range of about 30–300 microns dispersed through an organic binder, and both layers are subjected to another sintering for uniting said layers and eliminating said organic binder.

10. A method as recited in claim 8 in which said non-porous layer is formed by projecting a fine powder of said solid electrolyte material against a heated support and thereafter projecting a larger particle size of said material to form said porous layer.

11. A method as recited in claim 8 in which said non-porous layer is formed by projecting a fine powder of said solid electrolyte material against a heated support from a first distance and thereafter said porous layer is formed over said non-porous layer by projecting said electrolyte material powder from a greater distance.

12. A method as recited in claim 8 in which said non-porous layer is preliminarily formed by compressing a fine powder of said solid electrolyte material into the shape of said layer, thereafter pressing a coarser powder of said material into said porous layer and onto said non-porous layer with less pressure than was used in pressing said non-porous layer, and sintering both said compressed layers together.

References Cited

UNITED STATES PATENTS

| 3,160,527 | 12/1964 | Hess | 136—86 |
| 3,235,473 | 2/1966 | Le Duc. | |
| 3,377,203 | 4/1968 | Mogius et al. | |

FOREIGN PATENTS 487,205  10/1952  Canada.

ALLEN B. CURTIS, *Primary Examiner.*

U.S. Cl. X.R.

117—217; 136—153; 264—61